(12) United States Patent
Peuser et al.

(10) Patent No.: US 8,886,848 B2
(45) Date of Patent: Nov. 11, 2014

(54) METHOD AND DEVICE FOR ASSIGNING ADDRESSES IN A SYSTEM HAVING A PLURALITY OF GENERATOR UNITS POSITIONED IN PARALLEL

(75) Inventors: Thomas Peuser, Ludwigsburg (DE); Helmut Suelzle, Freiberg (DE)

(73) Assignee: Robert Bosch GmbH, Stuttgart (DE)

( * ) Notice: Subject to any disclaimer, the term of this patent is extended or adjusted under 35 U.S.C. 154(b) by 1425 days.

(21) Appl. No.: 12/087,885

(22) PCT Filed: Jan. 16, 2007

(86) PCT No.: PCT/EP2007/050369
§ 371 (c)(1),
(2), (4) Date: Apr. 18, 2011

(87) PCT Pub. No.: WO2007/082872
PCT Pub. Date: Jul. 26, 2007

(65) Prior Publication Data
US 2011/0190949 A1 Aug. 4, 2011

(30) Foreign Application Priority Data
Jan. 16, 2006 (DE) .......................... 10 2006 001 982

(51) Int. Cl.
*G06F 3/00* (2006.01)
*G05B 19/042* (2006.01)

(52) U.S. Cl.
CPC .. *G05B 19/0423* (2013.01); *G05B 2219/21039* (2013.01); *G05B 2219/21091* (2013.01)
USPC .................................................. 710/9; 710/8

(58) Field of Classification Search
None
See application file for complete search history.

(56) References Cited

U.S. PATENT DOCUMENTS

| 5,233,229 | A |   | 8/1993 | Kohl et al. |   |
|---|---|---|---|---|---|
| 5,680,239 | A | * | 10/1997 | Liva et al. | 398/98 |
| 5,708,831 | A | * | 1/1998 | Schon | 709/245 |
| 5,740,379 | A | * | 4/1998 | Hartwig | 710/104 |
| 6,738,920 | B1 | * | 5/2004 | Horne | 713/500 |

FOREIGN PATENT DOCUMENTS

| BF | 197 50 470 | 6/1999 |
|---|---|---|
| DE | 41 08 861 | 10/1992 |
| DE | 10 2005 12 270.1 | 7/2006 |
| EP | 1 503 262 | 2/2005 |
| EP | 1 530 108 | 5/2005 |
| JP | 2005-110418 | 4/2005 |
| JP | 2005-193741 | 7/2005 |

* cited by examiner

*Primary Examiner* — Farley Abad
*Assistant Examiner* — Richard B Franklin
(74) *Attorney, Agent, or Firm* — Kenyon & Kenyon LLP

(57) ABSTRACT

A method for assigning addresses in a system having a first generator unit and at least one further generator unit positioned in parallel to the first generator unit. Each of the generator units has a control-signal input and a control-signal output. The control-signal input of each further generator unit is connected in each instance to the control-signal output of another of the generator units. Each of the further generator units receives an identification signal output at the control-signal output of a generator unit upstream of it, and assigns itself an individual address as a function of the respective identification signal received, the address depending on the length of the identification signal received.

14 Claims, 2 Drawing Sheets

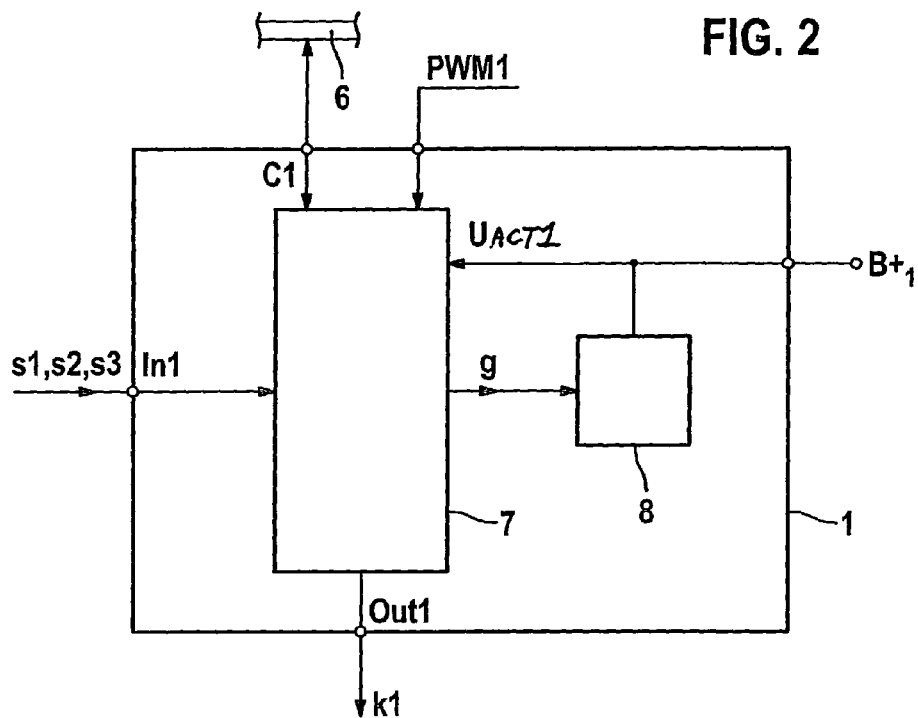
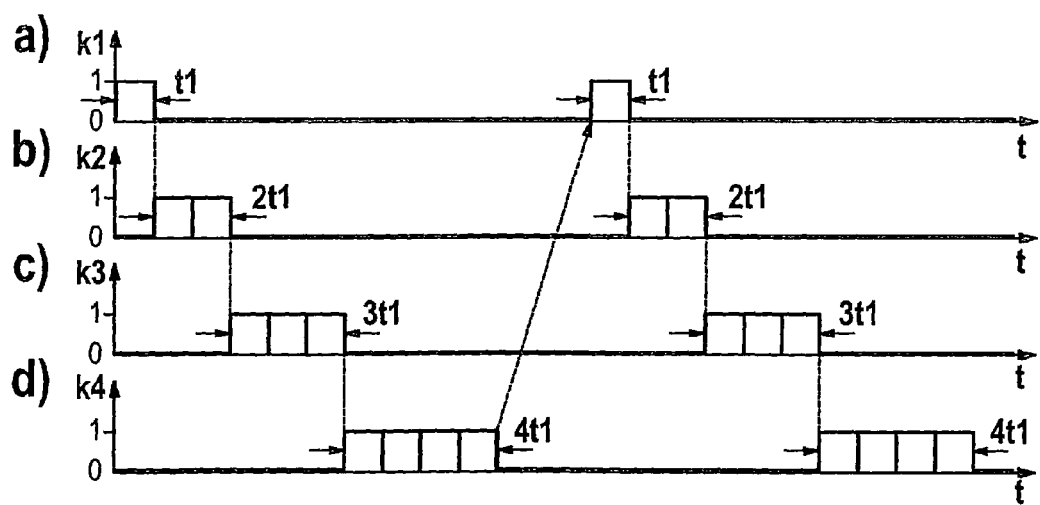

METHOD AND DEVICE FOR ASSIGNING ADDRESSES IN A SYSTEM HAVING A PLURALITY OF GENERATOR UNITS POSITIONED IN PARALLEL

FIELD OF THE INVENTION

The present invention relates to a method and a device for assigning addresses in a system having a plurality of generator units positioned in parallel relative to each other. For example, in a motor vehicle, the supply voltage for the loads of the electrical system may be provided by generator units connected in parallel in this way.

BACKGROUND INFORMATION

The electrical system of a motor vehicle may be powered using a generator.

Moreover, the electrical system of certain vehicles, e.g., safety vehicles, ambulances and commercial vehicles, may be supplied with energy using at least two generators, in order to be able to ensure the required power demand and/or the required reliability of the electrical supply.

The wear, and therefore also the service life of a generator depends on several factors. One of these factors is its electrical capacity utilization. The greater the electrical capacity utilization of a generator, the greater its wear and the lower its remaining service life. Therefore, it is desirable to be able to control the capacity utilization of the generators used according to strategies specific to the application. For example, application-specific strategies are a uniform capacity utilization or a very one-sided distribution of the capacity utilization.

German Patent document DE 10 2005 12 270.1 discusses a method and a device for providing the supply voltage for the loads of a vehicle electrical system, using several generators. A regulating unit having at least one power transistor is assigned to each of the generators. In order to bring the degree of capacity utilization of the generators into agreement, in one of the regulating units, a pulse-width-modulated control signal or a control signal derived from it and describing the pulse duty factor of the pulse-width-modulated signal is formed and supplied to the power transistors of all regulating units.

Moreover, a device having generators connected in parallel is discussed in German Patent document DE 41 08 861 A1. In this device, a voltage regulator is assigned to each of the generators. The device also has at least one battery whose one terminal is connectable to the voltage regulator via an ignition switch. Furthermore, a charge-indicator device is provided which is connected to the ignition switch and the voltage regulators, and is connectable via a circuit element to the negative terminal of the battery which may be connected to ground. Between the charge-indicator device, the voltage regulators and the indicated circuit element is a circuit configuration having a plurality of components conductive in one direction and blocking in one direction. To be achieved by this device is that a high electrical power can be produced by the use of two generators, and that faults occurring in one of the two generator/voltage-regulator systems can be indicated by a single indicator, e.g., a charge-indicator lamp, while the other generator/voltage-regulator system can continue working without problem.

SUMMARY OF THE INVENTION

In contrast, a method having the features described herein has the advantage that the individual generator units belonging to the overall system each have their own individual address. They are able to be differentiated based on this separate individual address, and are able to be accessed individually if necessary. This individual addressing may be accomplished by a control unit which is connected to the generator units via a data bus. For example, the control unit directs a diagnostic query to one of the generator units. It responds to the control unit by sending data relevant for the diagnostics back to it, together with the individual address.

One special advantage of the exemplary embodiments and/or exemplary methods of the present invention is that no external coding or any external wiring which, for example, would already have to be predetermined when configuring the circuitry, are needed for assigning addresses. In the exemplary embodiments and/or exemplary methods of the present invention, the further generator units themselves in each case automatically assign themselves an individual address. This is accomplished in that each receives an identification signal output at the control-signal output of a generator unit upstream of it, and assigns itself an individual address as a function of the respective identification signal received, the address depending on the length of the identification signal received.

Advantageously, the self-assignment of the individual addresses is initiated by the first generator unit which, on its part, is supplied a specific signal via its control-signal input, based on which signal it identifies itself as master.

If the first generator unit has a data interface, then a prompt signal is able to be supplied to it via this data interface, after the receipt of which, the first generator unit initiates the output of an identification signal. This has the advantage that, for example, a control unit connected to the data bus is able to select the instant of the address assignment as a function of the existing requirements.

The features also described herein advantageously make it possible for the specific generator unit to draw conclusions about its position within the parallel connection of the generator units based on the time length of the identification signal. For example, the position of the generator unit corresponds to the length of the identification signal, received at the control-signal input, in units of time of the received signal plus 1. Thus, a generator unit which, at its control-signal input, receives an identification signal whose length corresponds to one unit of time, is located at position 2, that is, is connected directly downstream of the generator unit serving as master.

If each generator unit outputs the identification signal, output by it at its control-signal output, several times, as indicated herein, then the likelihood of errors occurring during the assigning of addresses is reduced.

According to the features described herein, the generator units each transmit their individual address via a data bus to a control unit. This may take place automatically after the respective generator unit or after all generator units have assigned themselves their individual address. Alternatively, after a predefined time span has elapsed since the occurrence of a start signal, the control unit may automatically output a query signal via the data bus, which the generator units receive and respond to accordingly.

If, by this transmission of addresses, the control unit knows how many generator units are available for the parallel operation and which address is assigned to each of these generator units, then during later operation, the control unit is able to use this knowledge to address each of the generator units individually via the data bus and to transmit queries or commands to the respective generator unit or retrieve data from the respective generator unit.

Further advantageous characteristics of the exemplary embodiments and/or exemplary methods of the present invention are yielded from their exemplary clarification with reference to the figure.

BRIEF DESCRIPTION OF THE DRAWINGS

FIG. 2 shows a detailed representation of first generator unit 1 of FIG. 1.

FIG. 3 shows timing diagrams for illustrating the assigning of addresses according to the exemplary embodiments and/or exemplary methods of the present invention.

DETAILED DESCRIPTION

Figure 1:
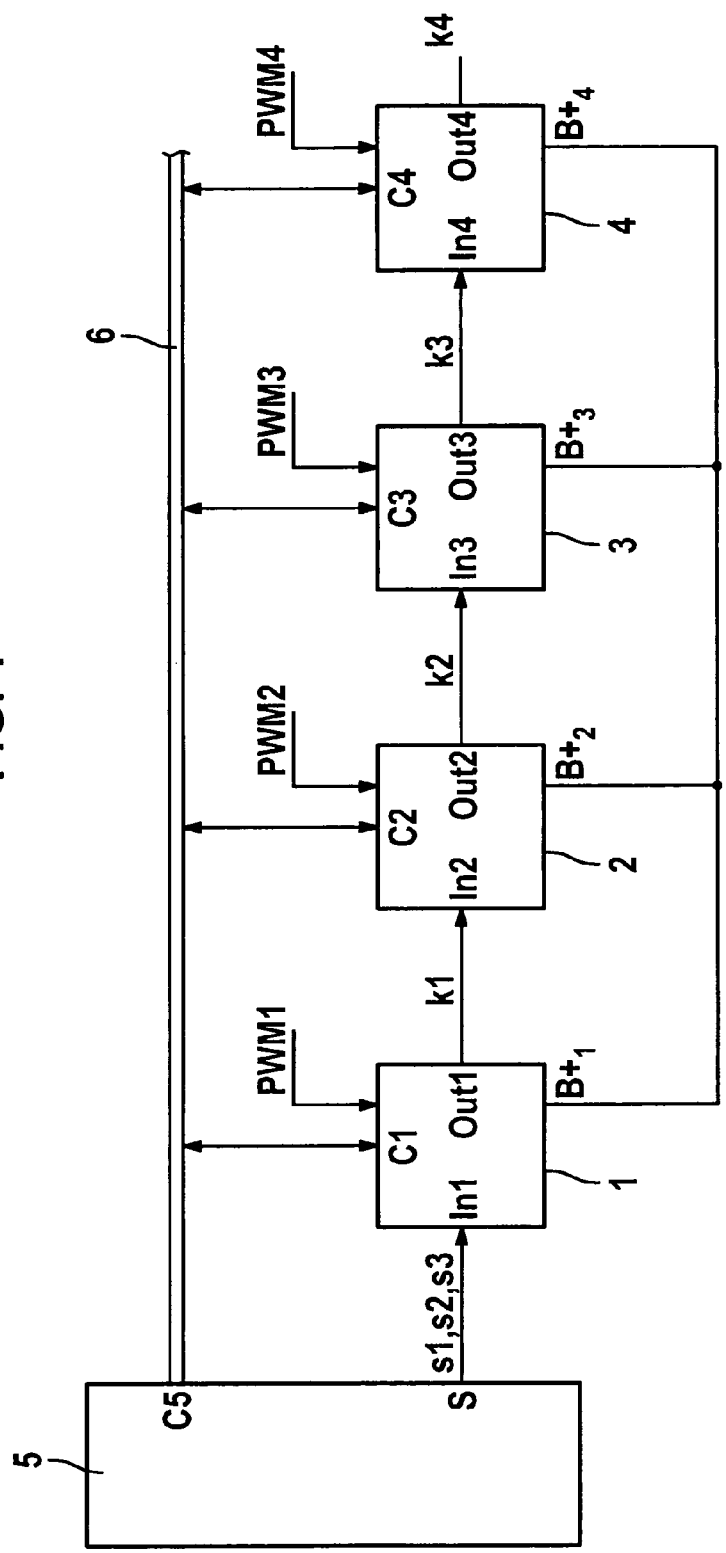
FIG. 1 shows a block diagram for explaining the assigning of addresses according to the exemplary embodiments and/or exemplary methods of the present invention.

FIG. 1 shows a block diagram for explaining the assigning of addresses according to the exemplary embodiments and/or exemplary methods of the present invention.

This block diagram includes a first generator unit 1, a second generator unit 2, a third generator unit 3 and a fourth generator unit 4. These generator units are connected in parallel to each other in terms of their function, which is to make a DC supply voltage available for the loads of a vehicle electrical system.

A pulse-width-modulated drive signal PWM1 is fed to first generator unit 1, a pulse-width-modulated drive signal PWM2 is fed to second generator unit 2, a pulse-width-modulated drive signal PWM3 is fed to third generator unit 3, and a pulse-width-modulated drive signal PWM4 is fed to fourth generator unit 4. These pulse-width-modulated signals, which are made available by a signal source not shown in FIG. 1, are converted by a controller of the respective generator unit into generator control signals and fed to the generator of the respective generator unit.

As a function of the generator control signal fed to it, this generator makes available at its output, an actual voltage value which is present in the form of a positive supply voltage at the voltage-supply output of the respective generator unit.

As evident from FIG. 1, positive supply voltages $B+_1$, $B+_2$, $B+_3$ and $B+_4$ are available at the voltage-supply outputs of the generator units. Since these voltage-supply outputs are interconnected, the total supply voltage made available is combined from the supply voltages provided by generator units 1, 2, 3 and 4. This parallel connection of a plurality of generator units ensures that the power requirement demanded during operation and the required reliability of the voltage supply exist for the loads of a vehicle electrical system.

During operation of the device shown in FIG. 1, wear of the generator units or generators occurs. For this reason, it is very important to monitor the individual generators in order to have information available about the condition of the generators. This information includes, for example, that a generator has failed, that a temperature above normal exists, that a generator is no longer rotating, etc. If necessary, based on this information, a generator may be replaced in order to continue to ensure the desired voltage supply.

For the purpose of this monitoring or diagnostics, query signals are fed to the individual generator units by a control unit 5 via its data interface C5 and a data bus 6. As response to these query signals, the respective generator unit transmits data illustrating the condition of the generator of the respective generator unit to the control unit via data bus 6.

During this transmission of the query signals to the respective generator unit and during the transmission of the data describing the generator condition, the useful data indicated are transmitted together with an individual address which specifies the specific generator unit, and therefore the specific generator, as well.

In the exemplary embodiments and/or exemplary methods of the present invention, these individual addresses of the generator units are stipulated or assigned as follows:

After a starting procedure, a start signal is output by a start-signal transmitter, which is a control unit 5 in the exemplary embodiment shown in FIG. 1. For example, a starting procedure takes place after each new start of the engine and also after each reset of the system as carried out, for example, after the occurrence of a malfunction.

In the exemplary embodiment shown, start signal s1 is output at an output S of control unit 5.

This start signal s1 is supplied to a control-signal input In1 of first generator unit 1. The controller of this generator unit 1 recognizes the presence of start signal s1 and checks as to whether an address-assigning start signal s2 and a predefined control signal s3 are being supplied to it via control-signal input In1. For example, control signal s3 is a specific voltage level. If address-assigning start signal s2 and control signal s3 are present, the controller then assigns to itself, that is, assigns to first generator unit 1 an individual address, e.g., the address "1". Furthermore, based on control signal s3, it recognizes that it is to perform master functions for the following parallel operation of the generators. Moreover, it makes an identification signal k1 available at a control-signal output Out1 of first generator unit 1. This identification signal k1 is one pulse of time length t1.

This identification signal k1 contains information to the effect that it comes from a generator unit which has assigned to itself the address "1", and is applied to control-signal input In2 of second generator unit 2. The controller of this second generator unit 2 recognizes the presence of identification signal k1 and assigns to itself, that is, assigns to second generator unit 2 an individual address, e.g., the address "2". Furthermore, based on identification signal k1, it recognizes that it is to assume the slave function for the following parallel operation of the generators. Moreover, it makes an identification signal k2 available at a control-signal output Out2 of second generator unit 2. This identification signal k2 involves two successive pulses of time length t1. Altogether, therefore, identification signal k2 has the time length 2t1.

This identification signal k2 contains information to the effect that it comes from a generator unit which has assigned to itself the address "2", and is applied to control-signal input In3 of third generator unit 3. The controller of this third generator unit recognizes the presence of identification signal k2 and assigns to itself, that is, assigns to third generator unit 3 an individual address, e.g., the address "3". Furthermore, based on identification signal k2, it recognizes that it is to assume the slave function for the following parallel operation of the generators. Moreover, it makes an identification signal k3 available at a control-signal output Out3 of third generator unit 3. Identification signal k3 involves three successive pulses of time length t1. Altogether, therefore, identification signal k3 has the time length 3t1.

This identification signal k3 contains information to the effect that it comes from a generator unit which has assigned to itself the address "3", and is applied to control-signal input In4 of fourth generator unit 4. The controller of this fourth generator unit recognizes the presence of identification signal k3 and assigns to itself, that is, assigns to fourth generator unit 4 an individual address, e.g., the address "4". Furthermore, based on identification signal k3, it recognizes that it is to assume the slave function for the following parallel operation of the generators. Moreover, it makes an identification signal k4 available at a control-signal output Out4 of fourth generator unit 4. Identification signal k4 involves four successive pulses of time length t1. Altogether, therefore, identification signal k4 has the time length 4t1.

The addresses the generator units have assigned themselves are transmitted from the respective generator unit via its respective data interface C1, C2, C3, C4 and data bus 6 to control unit 5 and stored there.

The addresses may be transmitted automatically from the generator units to control unit 5 when the respective generator unit has assigned itself its individual address, or when all the generator units have assigned themselves their individual address. Alternatively, it is also possible, after a predefined time span has elapsed since the occurrence of the start signal, for control unit 5 to send out query signals via the data bus, to which the generator units react in order to signal to the control unit that they are available and what address they have in each case.

The reassignment of addresses after each start of the engine and after each system reset also has the advantage of a flexible parallel operation. For example, in the course of service work, one of the generator units may be removed. This removal is recognized during the next reassignment of addresses, since only three generator units respond with address signals to the control unit. Care must only be taken that the generator units form a series connection with respect to their control-signal inputs and outputs, which must not be interrupted. For example, in the event third generator unit 3 is removed, control-signal output Out2 of second generator unit 2 must be connected to control-signal input In4 of fourth generator unit 4.

Moreover, in the course of service work, an additional generator unit may also be added. This addition is recognized during the next reassignment of addresses, since now five generator units respond with address signals to the control unit. Care must only be taken that the generator units form a series connection with respect to their control-signal inputs and outputs, which must not be interrupted. For example, in the event a fifth generator unit is added, care must be taken that control-signal output Out4 of fourth generator unit 4 is connected to the control-signal input of the fifth generator unit.

In the exemplary embodiment described above, start signal s1 and address-assigning start signal s2 were made available at an output S of control unit 5. According to another specific embodiment not shown in FIG. 1, start signal s1 may also be provided by a different start-signal transmitter and supplied to first generator unit 1 via its data interface C1. In the same way, address-assigning start signal s2 may also be supplied to first generator unit 1 via data interface C1.

In the exemplary embodiment described above, at the instant of the output of the start signal, at control-signal outputs Out1, Out2, Out3 and Out4 a low-level signal is present.

Alternatively, at the instant of the output of the start signal, at control-signal outputs Out1, Out2, Out3 and Out4 a different signal may also be present, which, however, must be distinguishable from control signal s3.

FIG. 2 shows a detailed representation of first generator unit 1 of FIG. 1.

Generator unit 1 has a controller 7 and a generator 8. Controller 7 is realized in the form of an integrated circuit or is set up in the form of a circuit having discrete components.

Start signal s1, address-assigning start signal s2 and control signal s3 applied to control-signal input In1 of generator unit 1 are supplied as input signals to controller 7. During later parallel operation, pulse-width-modulated drive signals PWM1 are supplied to controller 7. Controller 7—prompted by start signal s1 and address-assigning start signal s2 and with the aid of control signal s3 applied to control-signal input In1—identifies itself, that is, identifies generator unit 1 as master and assigns itself an individual address. Furthermore, it generates identification signal k1 and makes it available at control-signal output Out1 of first generator unit 1. In addition, the address which the controller has assigned to itself, that is, to generator unit 1, is transmitted via data interface C1 and data bus 6 to the control unit.

Moreover, during later parallel operation, query signals from the control unit are transmitted to controller 7 via data interface C1, and the diagnostic data requested by the control unit are transmitted from controller 7 via data interface C1 and data bus 6 to the control unit.

In addition, controller 7 provides generator control signals g to generator 8. As reaction to these generator control signals g, the generator provides an actual DC-voltage value $U_{Act1}$ at an output. It is fed back to controller 7 and used there along the lines of a control process for ascertaining new generator control signals g. The actual DC-voltage value is also made available as positive DC supply voltage $B+_1$ at an output of the first generator unit.

Moreover, in parallel operation, at one of its terminals, which may be via its terminal Out1, controller 7 outputs a signal that describes the degree of capacity utilization of generator 8.

The design of generator units 2, 3 and 4 corresponds with the design of generator unit 1, so that in the case of the exemplary embodiment shown, four generator units of the same design connected in parallel contribute to the provision of the DC supply voltage for the loads of a motor-vehicle electrical system.

These generator units each assign themselves an individual address after each starting procedure. In so doing, initially the first generator unit assigns itself an individual address and outputs a first identification signal at its control-signal output. Each of the further generator units receives an identification signal output at the control-signal output of a generator unit upstream of it and, as reaction to the receipt of this identification signal, assigns itself an individual address as a function of the respective identification signal.

In the exemplary embodiment described above, four generator units connected in parallel contribute to the provision of the DC supply voltage. Alternatively, a total of 2, 3, 5, 6 or even a greater number of generator units connected in parallel may also be used to provide the desired DC supply voltage.

In the exemplary embodiment described above, in each case the identification signal contains information as to what generator unit it comes from, and the controller of the generator unit receiving the identification signal assigns itself an individual address based on the length of the identification signal received. Furthermore, the controller generates a new identification signal whose time length is increased compared to the identification signal received, which may be by one unit of time, and makes this new identification signal available at the control-signal output of the respective generator unit.

FIG. 3 shows timing diagrams for illustrating the assigning of addresses according to the exemplary embodiments and/or exemplary methods of the present invention.

FIG. 3a shows identification signal k1, which is one pulse of time length t1, made available at output Out1 of generator unit 1 shown in FIG. 1. To reduce the likelihood of transmission errors, this identification signal k1 is provided twice—as likewise evident from FIG. 3a—or even more frequently.

FIG. 3b shows identification signal k2, which altogether has the time length 2t1, provided at output Out2 of generator unit 2 shown in FIG. 1. This identification signal k2 is likewise provided twice or more.

FIG. 3c shows identification signal k3, which altogether has the time length 3t1, made available at output Out3 of generator unit 3 shown in FIG. 1. This identification signal k3 is likewise provided twice or more.

FIG. 3d shows identification signal k4, which altogether has the time length 4t1, made available at output Out4 of generator unit 4 shown in FIG. 1. This identification signal k3 is likewise provided twice or more.

In the exemplary embodiment described above, in parallel operation, pulse-width-modulated control signals are in each case fed to the generator units via a separate input. Alternatively, it is also possible to perform the address assignment described above during an initialization phase, and after the initialization phase has ended, to alter the function of the control-signal inputs and control-signal outputs for the subsequent parallel operation. Thus, in parallel operation, generator unit 1 is able to output a pulse-width-modulated control signal at its control-signal output Out1. All other generator units receive this signal at their control-signal inputs, and output it again, unchanged, at their control-signal outputs. The degree of capacity utilization of the generators is thereby able to be brought into agreement.

Furthermore, in the exemplary embodiment described above, signals s1 and s2 are signals which occur at different instants. According to another specific embodiment of the present invention, there is only a single start signal, which is used as start signal and at the same time as address-assigning start signal.

What is claimed is:

1. A method for assigning addresses in a system, the system including a first generator unit and at least one further generator unit positioned in parallel to the first generator unit, each of the generator units including a control-signal input and a control-signal output, and the control-signal input of each of the at least one further generator unit being connected to the control-signal output of another of the generator units, the method comprising:
   for each of the at least one further generator unit:
      receiving at the respective further generator unit an identification signal output from the control-signal output of a generator unit upstream of the respective further generator unit;
      subsequently, identifying a length of time the respective received identification signal lasts; and
      subsequent to the identifying:
         outputting, at the control-signal output of the respective further generator unit, a modified identification signal whose length is increased compared to the identified length of time; and
         assigning, by the respective further generator unit and to itself, a respective unique address as a function of the respective identified length of time.

2. The method of claim 1, wherein via its control-signal input, the first generator unit is supplied a specific signal, based on which it identifies itself as a master, and the first generator unit initiates the self-assignment of the addresses of the at least one further generator unit by outputting an identification signal at its control-signal output.

3. The method of claim 2, wherein a prompt signal is fed to the first generator unit via its data interface, and in reaction to a receipt of the prompt signal, the first generator unit initiates the self-assignment of the addresses of the at least one further generator unit by outputting the identification signal.

4. The method of claim 1, wherein for the each of the at least one further generator unit, the increase of the length of the modified identification signal is by one unit of time compared to the identification signal received by the respective generator unit.

5. The method of claim 1, wherein each generator unit outputs the identification signal at its control-signal output at least two times.

6. The method of claim 1, wherein the generator units transmit their individual addresses via their data interfaces and a data bus to a control unit.

7. The method of claim 6, wherein the generator units transmit their individual addresses via the data bus to the control unit after receiving a query signal output by the control unit.

8. A device for assigning addresses in a system, comprising:
   a first generator unit; and
   at least one further generator unit positioned in parallel to the first generator unit, each of the generator units including a control-signal input and a control-signal output, a data interface, and the control-signal input of each of the at least one further generator unit being connected to the control-signal output of another of the generator units;
   wherein each of the further generator units is configured to:
      receive an identification signal output from the control-signal output of a generator unit upstream of the respective further generator unit;
      subsequently, identify a length of time the respective received identification signal lasts; and
      subsequent to the identification of the length of time:
         output, at the control-signal output of the respective further generator unit, a modified identification signal whose length is increased compared to the identified length of time; and
         assign to itself a respective unique individual address as a function of the respective identified length of time.

9. The device of claim 8, further comprising: a data bus to which the data interfaces of the generator units are coupled.

10. The device of claim 9, wherein the data interfaces of the generator units are connected via the data bus to a control unit.

11. The device of claim 10, wherein the generator units each include a respective controller and a respective generator, the self-assignment, by each of the at least one further generator unit, of the respective individual address of the respective further generator unit being performed by the respective controller of the respective further generator unit, and the respective controller being configured to transmit the respective individual address of the respective further generator unit via the data bus to the control unit.

12. The device of claim 11, wherein the respective controller transmits the respective individual address of the respective further generator unit via the data bus to the control unit after receiving a query signal output by the control unit.

13. The device of claim 9, wherein the generator units connected in parallel make the supply voltage available for at least one load of a vehicle electrical system.

14. A method for assigning addresses in a system, the system including a first generator unit and second generator unit, the second generator unit including a control-signal input and a control-signal output, and the control-signal input being connected to a control-signal output of the first generator unit, the method comprising:

receiving at the second generator unit an identification signal output from the control-signal output of the first generator unit;

subsequently, identifying how long the received identification signal lasts; and subsequent to the identifying:
  outputting, at the control-signal output of the second generator unit, a modified identification signal which is longer than the received identification signal; and
  assigning, by the second generator unit and to itself, a unique address as a function of the identification of how long the received identified signal lasted.

* * * * *